INVENTOR
HUMBERTO R. CORDERO
BY Ronald J. Clark
ATTORNEY

United States Patent Office 3,432,810

Patented Mar. 11, 1969

3,432,810

ADDRESSING SYSTEM FOR A COMPUTER EMPLOYING A PLURALITY OF LOCAL STORAGE UNITS IN ADDITION TO A MAIN MEMORY

Humberto R. Cordero, Endicott, N.Y., assignor to International Business Machines Corporation, Armonk, N.Y., a corporation of New York Filed May 31, 1966, Ser. No. 553,973

U.S. Cl. 340—172.5 4 Claims

Int. Cl. G06f *7/06*

ABSTRACT OF THE DISCLOSURE

This storage addressing system provides for addressing local storage and main storage from the same address registers. When I/O devices require access to local storage, the I/O device address incldues indicia indicating the particular local storage unit to be used as well as the specific location within the selected local storage unit. The same register is used for both local storage and main storage. When local storage is used, certain outputs from the address register are diverted to a local storage address decode unit.

Figure 1:
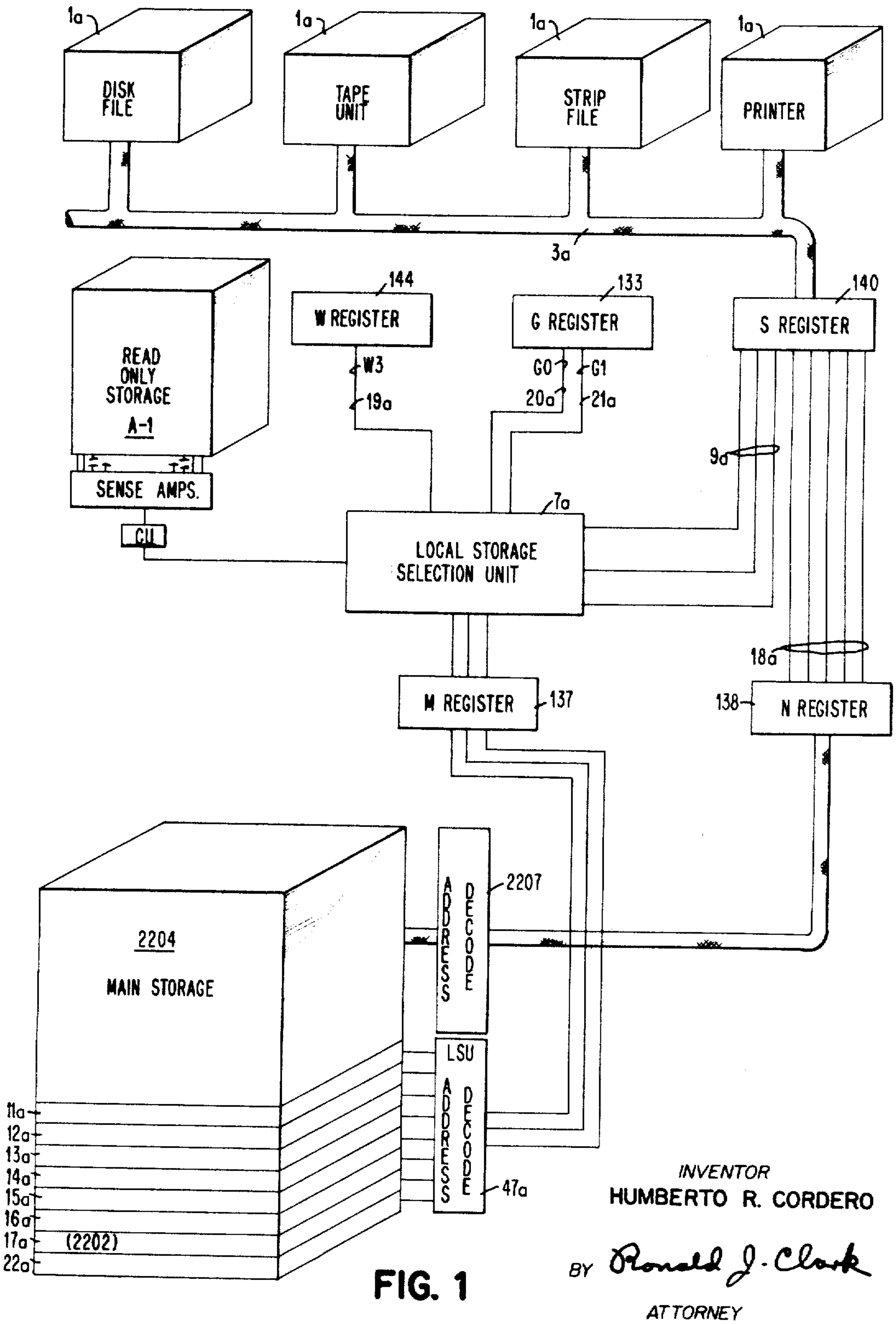

The present invention relates in general to selectable address circuits and, more particularly, to a versatile multipurpose address circuit operating in combination with a plurality of input-output (I/O) units in one mode of operation and operating in combination with internal computer registers reflecting certain machine conditions in a second mode of operation.

An electronic data processor (EDP) having a local storage unit (LSU) in addition to its main memory is described by G. M. Amdahl et al. in their U.S. patent application entitled "Data Processing System," S.N. 357,372, filed Apr. 6, 1964, and assigned to the assignee of the present invention. A memory addressing scheme for use with an EDP constructed according to the aforementioned patent application is described by L. A. Michael in his U.S. Patent 3,317,902, entitled "Address Selection Control Apparatus," assigned to the assignee of the present invention.

The addition of a LSU to an EDP is very advantageous to the total through-put which can be processed by the CPU. This through-put is increased by assigning certain storage functions to the LSU which cannot be conveniently performed by the main memory. For example, the LSU includes the general purpose registers, floating point registers and tag registers; and further includes storage positions for Program Status Words (PSW), Unit Control Words, (UCW), Partial Arithmetic Words, Conversion Tables, and Miscellaneous Working Storage. However, by relegating the aforementioned functions to the LSU, the main memory is kept entirely free of "off limits" or prohibited areas, giving the programmer complete freedom in assigning addresses for data movement associated with the main memory. Any of the abovementioned functions which might require fixed locations in memory can be performed in the LSU. For a time sharing system, the advantages of having a completely uncluttered and freely assignable storage area lie in the fact that a plurality of programmers will be writing programs for use in the same CPU.

One of the advantageous features of the LSU is that it is limited to 256 individual byte storage positions, each of which positions comprise eight bit storage locations plus a parity bit. Therefore, an address signal comprising eight binary bits is sufficient to address all locations therein. The main memory address signal employs as many as twenty-four adress bits. When contrasted with the number of storage positions in the main memory, the LSU's capacity is almost insignificant, but the corresponding reduction in address bits gives a saving in storage space to those operation codes containing address indicia for referring to the positions within the LSU.

A further use of the present invention is in a data processing system employing either a large number of I/O units or operating in a compatibility mode, or a system having both. For a detailed description of the compatibility feature of such a CPU, see U.S. patent application, entitled "Program Mode Switching Circuits," S.N. 530,634, filed Feb. 28, 1966, and assigned to the assignee of the present invention. The conversion tables associated with the compatibility mode of operation should always be placed in one of the higher addressable LSU's available. This placement allows the convenient assignment of the hereinafter described Unit Control Words in the lowest addressable positions of memory. Since a UCW is addressed as a single unit, it has been found to be advantageous to use three of the eight available bits from an I/O device to select one LSU and the remaining five bits to select one of the thirty-two Unit Control Words in the selected LSU.

The high speed of the CPU and the slow speed of an I/O device make it desirable to operate a plurality of I/O devices at a time. The mechanism connecting these I/O devices to a CPU is commonly called a channel. By having many subchannels, each of which contains a current record of one I/O operation, the channel is able to read or write from several low-speed I/O devices at a time. When an I/O device requests service, the channel selects the subchannel associated with that I/O device and services the I/O device under control of the subchannel. In the present system a Unit Control Word (UCW) serves as a subchannel and thirty-two such UCW's are stored in one two-hundred and fifty-six position LSU. Since two hundred and twenty-four subchannels are operable with one CPU, seven LSU's are required to store all these UCW's. If the same CPU is equipped with the compatibility mode of operation, an additional pair of LSU's are required. Furthermore, there still remains the need to have an additional local storage unit to perform the remaining aforementioned functions such as general purpose registers, etc.

Existing addressing circuits for use with a CPU operating with a main memory and a pair of LSU's employ separate selection lines for selecting among the three storage areas available. Separate decode means is required for each area. Normally, when addressing main memory, a pair of address registers hold the address indicia for selecting a single location in main memory. Therefore, when desiring to select a single location in one of the LSU's, one decode circuit is selected and its corresponding drive line supplies a half select current or some similar selection mechanism to the cores in the selected LSU. Now, one of the two registers supplies the remaining half select current to the location specified by the address indicia held by that register. The remaining register does not participate in the selection of the local storage unit. When more LSU's are added, the above described addressing scheme becomes clumsy, expensive and impractical.

The improvement disclosed herein allows the removal of all separate decode circuits and their associated circuits and utilizes the two registers already available to select a much greater number of separate LSU's with only a minimum increase in the number of required circuits.

Accordingly, it is an object of the present invention to provide an improved addressing system for a CPU employing a plurality of local storage units in addition to its main memory.

It is a further object of the present invention to provide a CPU having a main memory, a plurality of local storage units appended thereto and an improved addressing system suitable for addressing the main memory and each LSU.

It is another object of the instant invention to provide an improved addressing circuit responsive to program changeable indicia for selecting between an available main memory and a group of local storage units.

It is a still further object of the instant invention to provide a local storage addressing circuit, compatible with a main storage addressing system whereby local storage addressing signals are available from sources responsive to program indicia for selecting one of a plurality of local storage areas by employing a majority of the addressing system used in the address circuits for the main storage area.

According to these and other objects the present invention contemplates the employment of a main storage area with an appended plurality of local storage areas. Read and write circuits are provided which interrogate both the local storage areas and the main storage area. A plurality of address registers are provided for energizing the addressed locations in said areas. Certain of said address register positions are provided with alternate sources of address indicia originating in hardware registers located throughout the EDP. These hardware registers have been assigned special purpose tasks requiring the access to a corresponding local storage area. A channel or plurality of channels are provided for transmitting address indicia between a plurality of I/O units and the address registers. A logic network is responsive to certain machine condition signals and the output of one field in a Read Only Storage (ROS) unit to select the source to be connected with the address registers.

More specifically, the logic network in one instance selects between the main memory and the remaining LSU's. In this situation, the function of the two available address registers is altered in that a portion of one register now selects one of the available LSU's and the remaining register selects the desired location within that LSU. In a second type of operation, the logic network responds to a combination of direct program indicia and machine condition indicating indicia to select among the available LSU's, and a portion of the remaining register selects the desired location or position within that LSU.

Figure 2A:
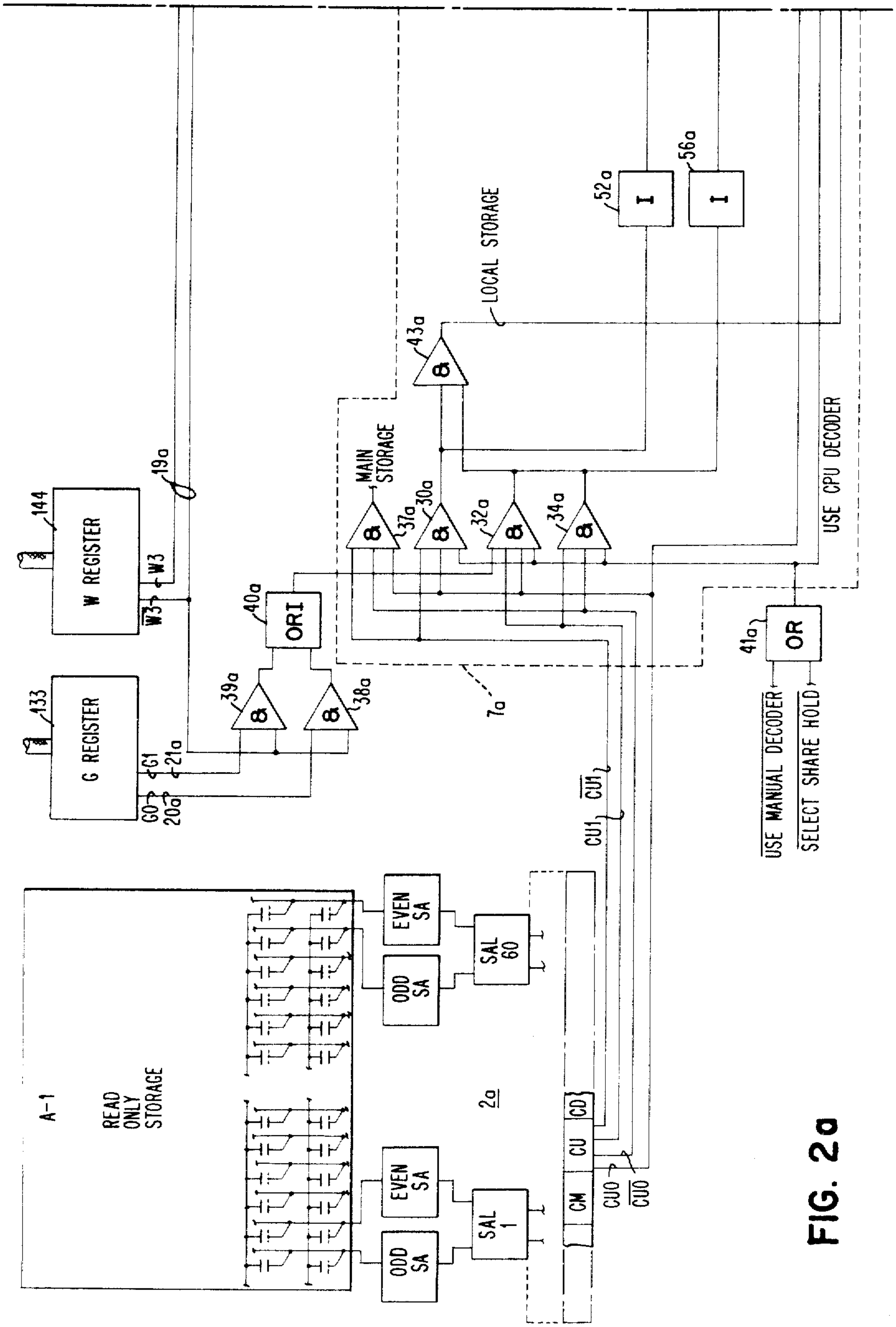
Figure 2B:
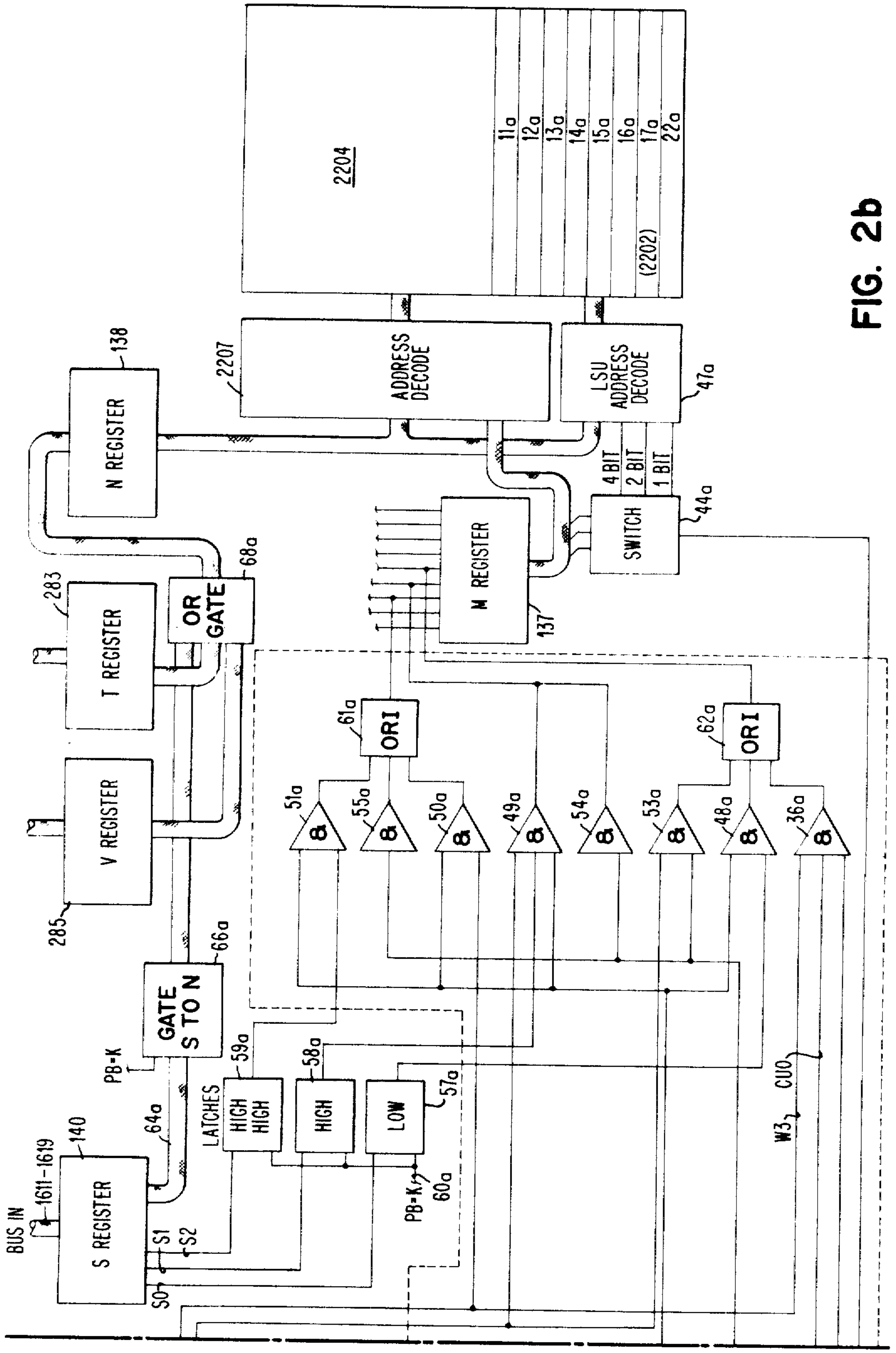

The foregoing and other objects, features and advantages of the invention will be apparent from the following more particular description of a preferred embodiment of the invention, as illustrated in the accompanying drawings, wherein FIG. 1 is a generalized block diagram of the instant invention; and FIGS. 2*a* and 2*b* are a more detailed logic diagram of the invention.

Referring to FIG. 1, there can be seen a generalized block diagram of the instant invention wherein a plurality of I/O units 1*a*, numbering as many as two-hundred and twenty-four, communicate with an input S register 140 over a channel 3*a*. The identifying numerals used throughout the present description will identify the identical units also described in U.S. Patent 3,315,235 entitled "Data Processing System," assigned to the assignee of the present invention. Numerals identifying elements not shown in the immediately above-described application are followed by the letter "*a*". The multiplex circuits, not shown, are the means by which one of the I/O units is selected. The selected unit or any other unit requesting a processor cycle communicates with the processor by sending an eight bit address to the S register 140. Three of these bits are applied to a LSU selection circuit 7*a* over a plurality of lines 9*a* and are employed to select one of the seven LSU sections 11*a* through 17*a* assigned for I/O use by a local storage address decode 47*a*. The remaining five bits on a plurality of lines 18*a* are applied to an N register 138 and an address decode circuit 2207 to select one of the thirty-two UCW's stored in the selected LSU. It is beyond the scope of the present description to teach the manner by which a UCW controls the operation of an I/O unit and a CPU.

Position three of a W register 144 indicates whether the CPU is operating in compatibility mode. The W register is connected to the circuit 7*a* by a line 19*a*. The zero and one positions of a G register 133 indicate whether the particular instruction presently being decoded is in the RR format. If this instruction is in the RR format, one of the LSU's 11*a* through 17*a* should be accessed because the operation calls for general purpose register operands and those reside in the LSU. The G register 133 is connected to the select circuit 7*a* by a pair of lines 20*a* and 21*a*. An ROS circuit A–1 contains a CU field of two bits which when decoded indicate the following conditions, namely, (1) whether the contents of a M register 137 and the contents of the N register 139 will address one location in a main memory 2204, (2) whether the contents of the M and N registers 137 and 138 will address one location in a compatibility section 22*a*, (3) whether the contents of the M and N registers 137 and 138 will address one location in one of the LSU's 11*a* through 17*a*, and (4) whether the address presently being decoded is in a special RR format indicating that one of the general registers, floating point registers or that the scratch pad portion of a CPU bump storage area 2202 should be accessed. Area 2202 is shown as coextensive with the LSU 17*a*, but this is shown only by way of example. Since three address bits are available to select an LSU while operating in I/O mode, eight such LSU's can be selected. It is a matter of choice in assigning how many LSU's will be used to store UCW's and which LSU's will store indicia for the compatibility features and which will maintain storage positions for the general purpose registers, etc.

Referring to FIG. 2*a*, there can be seen the read only storage (ROS) circuit A–1. This ROS circuit comprises a plurality of horizontally associated group of storage positions, one of which is selected by an address decode circuit, not shown. An entire horizontal row of storage positions is designated as one control word and, upon energization, the word is sensed by a plurality of sense amplifiers and sense amplifier latches 2A. The output of the sense amplifier latches is schematically shown as divided into field areas CM, CU and CD. These enumerated fields are merely illustrative. A plurality of other field designations might exist in an average control word. However, the field CU plays a substantial role in this improved local storage addressing circuit. The output from the CU field is applied to a plurality of AND INVERT (AI) gates 30*a*, 32*a*, 34*a*, and 36*a*. The G register 133 and the W register 144 comprise eight storage positions each. Certain of the positions in these registers operate to select the LSU 22*a* which is employed to store the conversion tables and other data needed when the CPU is operating in the compatibility mode of operation. The various positions of these registers, as is hereinafter described, operate to select under program control from among a plurality of LSU's the desired LSU. The connection with program control is possible since the G and W registers 133 and 144 respectively are conduits of electrical signals between the selection circuit 7*a* and program held in the main memory 2204. More specifically, these positions comprise the G0 and G1 positions of the G register 133, and the W3 position, in true and complement forms, in the W register. This is achieved, as hereinafter described in greater detail, by forcing various LSU addresses through the mechanism of the circuit 7*a* and additional inputs from the CU field of the ROS control word.

The output of the G register on the line 20*a* is applied to an AND gate 38*a*, and the output of the G register on the line 21*a* is connected to an AND gate 39*a*. The $\overline{\text{W3}}$ signal on the line 37*a* is the enabling signal for the AND gates 38*a* and 39*a*. The outputs from the AND gates 38*a* and 39*a* are connected to an OR INVERT (OI)

circuit 40*a*. The output of the circuit 40*a* is applied as a second input to the AI gate 32*a*.

The CU field comprises the true and complement signals of two signal lines identified as CU0 and $\overline{\text{CU0}}$; and CU1 and $\overline{\text{CU1}}$, respectively. The CU0 output from the CU field is applied to the AI circuit 30*a*. Two other input signals are applied to AI circuit 30*a*, one of which is $\overline{\text{CU1}}$ signal and the other one of which is the output of an OR circuit 41*a*. The OR circuit 41*a* has two input signals, one of which is the $\overline{\text{USE MANUAL DECODER}}$ signal and the other of which is the $\overline{\text{SELECT SHARE HOLD}}$ signal. The $\overline{\text{USE MANUAL DECODER}}$ signal is the inverted signal of the USE MANUAL DECODER signal shown in FIG. 4*y* of U.S. Patent 3,315,235. The $\overline{\text{SELECT SHARE HOLD}}$ signal originates in FIG. 47 of U.S. patent application S.N. 357,372, filed Apr. 6, 1964. The purpose of the USE MANUAL DECODER signal is to allow selection of an available LSU under control of manual switches when the machine is in the stopped state. It inhibits the control lines activated by the normal CU field of the ROS unit and the register paths from the G and W registers 133 and 144.

The purpose of the SELECT SHARE HOLD signal is to inhibit the manual access circuits and allow the dynamic circuits to address local storage. To reduce the complexity of the present description, the paths from the manual switches to the LSU selection circuit 7*a* are not shown. When the $\overline{\text{USE MANUAL DECODER}}$ and the $\overline{\text{SELECT SHARE HOLD}}$ signal are logical ones, the select circuit 7*a* shown in FIGS. 2*a* and 2*b* is inhibited and is not allowed to operate.

The A1 circuit 32*a* has four input signals, the first of which is the output of the OI circuit 40*a*, the second of which is the output of the CU field on the line CU1, the third of which is the output of the CU field on the line CU0 and, the fourth of which is the output of the OR gate 41*a*. The AI circuit 34*a* has three input signals, the first of which is the output of the CU field on the line CU1, the second of which is the output of the CU field on the line $\overline{\text{CU0}}$ and the third of which is the output of the OR gate 41*a*. The AND gate 36*a* has three input signals, the first of which is the USE CPU DECODER output signal from the OR gate 41*a*, the second of which is the CU0 signal from the CU field, and the third of which is the W3 signal from the W register 144. An AND circuit 37*a* has three input signals, the first of which is the output of the OR circuit 41*a*, the second of which is the $\overline{\text{CU1}}$, and the third of which is the $\overline{\text{CU0}}$. The output of the AND circuit 37*a* causes the contents of the M and N registers 137 and 138 to select a position in main memory 2204.

The outputs of the AI circuits 30*a*, 32*a* and 34*a* are applied to an additional AI circuit 43*a*. The output of the AND invert circuit 43*a* is identified as the LOCAL STORAGE signal. The LOCAL STORAGE signal is applied to an AND gate switch 44*a* for diverting a portion of the output lines of the M register 137, three are shown to the LSU Address Decode 47. This diverted portion ultimately selects one of the desired LSU's 11*a* through 17*a* and 22*a*.

The output of the AI circuit 30*a* is applied to a plurality of further AI circuits 48*a*, 49*a*, 50*a* and 51*a* by an additional INVERT circuit 52*a*. The output signal from the AI circuits 32*a* and 34*a* are applied to a further plurality of AI circuits 53*a* 54*a*, 55*a*, by an additional INVERT circuit 56*a*.

The function of a S register 140 as used in the present invention is as the ultimate destination of an I/O device address sent from the corresponding I/O device to the CPU over an input channel 3*a*, or more particularly, over a channel such as a BUS IN line 1611–1619 as shown in U.S. Patent 3,377,619 assigned to the assignee of the present invention. The output lines S0, S1 and S2 from the S register 140 are applied respectively to an extra low latch 57*a*, an extra high latch 58*a*, and an extra high-high latch 59*a*. The preceding output signals from the S register are gated into the latches 57*a* through 59*a* by a $PB=K$ signal on a line 60*a*. The origin of the $PB=K$ signal is described in U.S. Patent 3,315,235 with reference to FIG. 4*av*. Its function is to enable the multiplex channel latches when an I/O unit wishes to communicate with the CPU. However, for the purpose of the present invention the $PB=K$ signal is a gating signal which gates the contents of the S0, S1 and S2 positions of the S register 140 to the LSAR circuit 147*a* wherein the signals on the lines S0, S1 and S2 select one of the eight LSU's assigned the task of storing unit control words.

The output signal from the latch 59*a* is applied as a second input signal to the AI circuit 51*a*. The output signal from the latch 58*a* is applied as the second input signal to the AI circuit 49*a*, which has as its third input signal the $\overline{\text{W3}}$ signal from the W register 144. The output signal from latch 57*a* is applied as a second input signal to the AI circuit 48*a*. The AI circuit 50*a* has as its second input signal the W3 signal from the W register 144. The AI circuit 53*a* has as its second input the signal $\overline{\text{W3}}$ signal from the W register 144. The output signals from the AI circuits 50*a*, 55*a*, and 51*a* are applied to an OI circuit 61*a*. The output signals from the AI circuits 36*a* 38*a* and 53*a* are applied to an OI circuit 62*a*.

In operation, the instant invention has both a manual and automatic mode of operation. When the $\overline{\text{USE MANUAL DECODER}}$ and the $\overline{\text{SELECT SHARE HOLD}}$ signals are logical zeros, the automatic portion of of the instant invention is disabled, allowing manual setting of the M and N register 137 and 138, by means not shown, to select a location from the local storage units 11*a* through 17*a*.

The automatic mode of operation is enabled when the $\overline{\text{USE MANUAL DECODER}}$ signal and the $\overline{\text{SELECT SHARE HOLD}}$ signal are logical ones. In the first mode of operation, an I/O unit, desiring to interrupt the CPU and to steal a CPU cycle, communicates with the S register 140 over the bus-in lines 1611–1619. Three output signal lines from the S register are employed to select one of the LSU areas 11*a* through 17*a* as gated by the $PB=K$ signal on the line 60*a*. The remaining contents of the S register are applied to the N register 138 by a plurality of lines 64*a* to select one of the 32 UCW's stored in the selected local storage area. The $PB=K$ signal gates the lines 64*a* to the N register 138 through a gate 66*a* and an OR gate 68*a*. Alternate input signal sources for the N-register 138 are the V register 285 and T register 283. The three signal lines from the S register 140 are gated through the intervening plurality of gates 48*a*, 49*a*, and 51*a* by the output of the AI circuit 30*a* indicating that an I/O unit wishes to steal a CPU cycle. More specifically, an output signal from the AI circuit 30*a* indicates an I/O in the CU field of the ROS circuit.

A second operating combination is schematically represented by the equation $\overline{CU0}\cdot CU1\cdot \overline{W3}\cdot =111$. More specifically, the AI circuit 34*a* is enabled by the output of the CU field. AI circuits 53*a*, 54*a* and 55*a* receive the output of the AI circuit 34*a* through I circuit 56*a*. The AI circuit 53*a* receives its second enabling signal over the $\overline{\text{W3}}$ line.

A third operating situation is schematically represented by the equation $\overline{CU0}\cdot CU1\cdot W3=110$. More specifically, the contents of the CU field remains unchanged, but the $\overline{\text{W3}}$ signal is a binary zero causing the disabling of the AI circuit 53*a* and a resulting address including a binary zero in the least significant address position.

A fourth operating combination is schematically represented by the equation $CU0\cdot CU1\cdot \overline{W3}\cdot \overline{G0}\cdot \overline{G1}=111$. More specifically, the CU field provides a pair of enabling signals to the AI circuit 32*a*, the remaining enabling signal applied to the AI circuit 32*a* is generated by the OI circuit 40*a*. The G0 and G1 lines are binary zeros, therefore the OI circuit 40*a* has a negative input and a positive enabling output. The output from the AI circuit 32*a* enables the circuits 53*a*, 54*a* and 55*a* by the I circuit 56*a*. The $\overline{W3}$ enabling signal is also available to the AI circuit 53*a*, giving a resulting address of 111.

A fifth operating combination is schematically represented by the equation $CU0 \cdot CU1 \cdot W3 = 111$. In this equation the status of the G register positions G0 and G1 is immaterial because the absence of the $\overline{W3}$ signal causes the OI circuit 40*a* to generate an enabling signal for application to the AI circuit 32*a*. The circuit 32*a* has its two other enabling signals furnished thereto by the CU field. The W3 signal energizes the AI circuit 36*a* in combination with the CU0 signal, providing a binary one in the least significant bit address position and the output of the AI circuit 32*a* provides a binary one in the remaining higher order bit position by the A circuit 54*a* and the I circuit 55*a*.

A sixth operating combination is schematically represented by the equation $CU0 \cdot \overline{CU1} \cdot W3 = 101$. The W3 signal enables the AI circuit 50*a* in combination with the output of the AI circuit 30*a* representing a CU field of $CU0 \cdot \overline{CU1}$ selects the highest order bit position in the address field. The W3 signal in combination with the CU0 signal enables the AI circuit 36*a* to select the lowest order bit position in the address field. No combination of signals is available to select the middle address position so it remains a binary zero giving an address of 101.

The first operating combination shows the use of a field in the ROS circuit, selected by means not shown, in combination with a machine generated signal, $PB=K$, to gate the contents of an input bus 3*a* to the LSAR to select one LSU. The remaining contents of the S register are gated to the N register 138 by a GATE S to N circuit 66*a* responding to the $PB=K$ signal.

The second, third and sixth operating combination shows the use of a read only storage control signal from the CU field in combination with a program orginated signal in the W register to select one of three LSU's by an address forcing operation. The fifth operating combination shows an alternate group of signals for selecting the same LSU as selected by the second combination of signals.

The remaining fourth combination shows the use of the CU field in combination with the internal registers G and W, 133 and 144 respectively, to select an LSU. The G register 133 is the final recipient of signals which identify the current operation code as one requiring access to the general purpose registers, floating point registers and "scratch pad" areas assigned in LSU.

While the invention has been particularly shown and described with reference to a preferred embodiment thereof, it will be understood by those skilled in the art that various changes in form and details may be made therein without departing from the spirit and scope of the invention.

What is claimed is:

1. An addressing system for a storage device having a first, main storage area, and a second, local storage area comprising:

a single address register for said storage device, first decode means, connected to said address register, for accessing said main storage area, and second decode means for accessing said local storage area, gate means responsive to a signal indicating a local storage access for connecting predetermined positions in said address register to said second decode means for accessing said local storage area.

2. A system according to claim 1 wherein said storage device includes a plurality of local storage units, and said second decode means is operative to select one of said local storage units.

3. A system according to claim 2 further including second register means, means for entering an address into said second register from an I/O device, said address having a first portion designating a particular local storage unit and a second portion designating the position in said local storage unit, and means for transferring said first portion to said predetermined positions in said address register and said second portion to other positions in said thickness register.

4. An addressing system for a storage device having a first, main storage area, and a second, local storage area comprising:

a single address register for said storage device, first decode means, connected to said address register for accessing said main storage area, second decode means for accessing said local storage area, gate means, responsive to a signal indicating a local storage access, for connecting predetermined positions in said address register to said second decode means for accessing said local storage area, second register means, a plurality of input-output units each having a unique address and means for generating said address, means connecting said input-output units to said second register to transfer said unique address to said second register, and means for transferring at least a portion of said unique address from said second register to said predetermined positions in said address register.

References Cited

UNITED STATES PATENTS

| | | | |
|---|---|---|---|
| 3,317,902 | 5/1967 | Michael | 340—172.5 |
| 3,337,851 | 8/1967 | Dahm | 340—172.5 |
| 3,343,140 | 9/1967 | Richmond et al. | 340—172.5 |

PAUL J. HENON, *Primary Examiner.*

J. P. VANDENBURG, *Assistant Examiner.*

Dedication 3,432,810.—*Humberto R. Cordero*, Endicott, N.Y. ADDRESSING SYSTEM FOR A COMPUTER EMPLOYING A PLURALITY OF LOCAL STORAGE UNITS IN ADDITION TO A MAIN MEMORY. Patent dated Mar. 11, 1969. Dedication filed Mar. 3, 1972, by the assignee, *International Business Machines Corporation.*

Hereby dedicates to the Public the entire term of said patent.

[*Official Gazette September 12, 1972*]